United States Patent
Dang

(10) Patent No.: US 7,688,907 B2
(45) Date of Patent: Mar. 30, 2010

(54) METHOD FOR CHANNEL ESTIMATION IN ORTHOGONAL FREQUENCY DIVISION MULTIPLEXING SYSTEM AND DEVICE THEREOF

(75) Inventor: Shujun Dang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 664 days.

(21) Appl. No.: 11/652,758

(22) Filed: Jan. 12, 2007

(65) Prior Publication Data

US 2007/0183519 A1    Aug. 9, 2007

Related U.S. Application Data

(63) Continuation of application No. PCT/CN2005/000757, filed on May 30, 2005.

(30) Foreign Application Priority Data

Jun. 1, 2004    (CN) ............... 2004 1 0042935

(51) Int. Cl.
   *H04L 27/28* (2006.01)
(52) U.S. Cl. ................................... 375/260
(58) Field of Classification Search ........... 375/260, 375/267, 299, 347, 349; 700/53; 455/101, 455/132–141
   See application file for complete search history.

(56) References Cited

U.S. PATENT DOCUMENTS

| | | | |
|---|---|---|---|
| 6,654,429 B1 | 11/2003 | Li | 375/316 |
| 7,313,174 B2 * | 12/2007 | Alard et al. | 375/149 |
| 2003/0072254 A1 | 4/2003 | Ma et al. | 370/208 |
| 2003/0081695 A1 | 5/2003 | Eilts et al. | 375/316 |
| 2004/0086055 A1 | 5/2004 | Li | 375/260 |
| 2004/0131110 A1 * | 7/2004 | Alard et al. | 375/149 |
| 2004/0184570 A1 * | 9/2004 | Thomas et al. | 375/346 |

FOREIGN PATENT DOCUMENTS

| | | |
|---|---|---|
| CN | 1496622 A | 5/2004 |
| WO | WO-03/034646 A2 | 4/2003 |
| WO | WO 03/081938 | 10/2003 |

OTHER PUBLICATIONS

Supplementary European Search Report for Application No. EP05755158, dated Oct. 15, 2008.
Supplementary Partial European Search Report dated May 21, 2007 (4 pp).

* cited by examiner

*Primary Examiner*—Sam K Ahn
(74) *Attorney, Agent, or Firm*—Darby & Darby

(57) ABSTRACT

A method for channel estimation in an Orthogonal Frequency Division Multiplexing (OFDM) system, including: a transmitter determining a distribution density of pilot OFDM symbols according to the maximum Doppler frequency shift supported by the system, and transmitting pilot OFDM symbols and data OFDM symbols based on the distribution density of the pilot OFDM symbols; a receiver estimating frequency-domain channel information of the data OFDM symbols according to the received pilot OFDM symbols. The invention solves the problem of a large performance loss at a high-delay channel and a system with rapidly varying channel. The invention offers a better performance of channel estimation while the channel environment is varying rapidly, enhances the performance of a high-delay channel, makes a data communication system more suitable to a changing environment and makes better performance to the practical channel estimation, so that the data transmission efficiency of the system is increased.

17 Claims, 9 Drawing Sheets

METHOD FOR CHANNEL ESTIMATION IN ORTHOGONAL FREQUENCY DIVISION MULTIPLEXING SYSTEM AND DEVICE THEREOF

This is a continuation of International Application No. PCT/CN2005/000757 filed May 30, 2005, which claims the benefit of Chinese Patent Application No. 200410042935.2 filed Jun. 1, 2004, the entire respective disclosures of which are hereby incorporated herein by reference.

BACKGROUND OF THE DISCLOSURE

1. Field of the Invention

The invention relates to Orthogonal Frequency Division Multiplexing (OFDM) techniques, and, more specifically, relates to a method and a device for channel estimation in an OFDM system.

2. Background of the Invention

The OFDM technique is one of the frequency division multiplexing techniques for high rate data transmission services. Compared with traditional single carrier techniques, the OFDM provides higher spectrum efficiency by using simple equalization algorithm. Meanwhile, it is unnecessary to allocate frequency guard bands between adjacent subcarriers to avoid frequency interferences, which is adopted in the traditional Frequency Division Multiplexing (FDM), so that the bandwidth is saved.

Recently, the OFDM technique is widely used in the communications system, and has been applied in the wireless LAN standard 802.11a and the fixed wireless access standard 802.16a. Besides, regarding the wireless access network of 3GPP and the physical layer of IEEE 802.20, the OFDM technique is being considered for constructing mobile wireless access system with higher spectrum efficiency.

FIG. 1 shows a networking diagram of a typical frequency multiplexing cellular system. In this system, two Radio Network Controllers (RNC), RNC1 and RNC2, are connected to the Core Network (CN); some Base Stations (BS) are connected to one of the two RNCs: BS1, BS2 and BS3 connecting to RNC1, while BS4, BS5 and BS6 connecting to RNC2; two Mobile Stations (MS), MS1 and MS2, keep wireless connections with these BSs. FIG. 2 is a typical cell omnidirectional antenna multiplexing mode, or succinctly called cell multiplexing mode. FIG. 3 is a typical cell 120 degrees directional antenna multiplexing mode, or briefly called sectored multiplexing mode. A data transmission system using OFDM technique has the following advantages:

1. Good robustness under multipath delay spread. As shown in FIG. 4, a time-domain OFDM symbol includes two parts: a data part and a cyclic prefix part; the cyclic prefix part is generated by circulating the last portion of the data part; as shown in the diagram the data part occupies a duration $T_{data}$ and the cyclic prefix part occupies a duration $T_{cp}$. The robustness of the OFDM technique refers to that: comparing with an OFDM symbol duration $T_s$, a typical channel impulse response duration is quite short and occupies only a quite short part of the $T_s$, so by increasing a shorter cyclic prefix, i.e. the $T_{cp}$, the interference between signals caused by multipath is completely eliminated.

2. Good robustness under frequency selective fading. Through redundant solutions such as channel coding, the OFDM technique can recover the digital signal carried by a badly fading subcarrier.

3. Simple equalization algorithm. The OFDM technique transmits the signal in the frequency domain and simple multiplications can be used to express channel effects in the frequency domain, so that a simple one tap equalizer could be used to equalize the signal in the OFDM system.

4. Higher spectrum efficiency comparing with the commonly used FDM technique.

Although the data transmission system utilizing OFDM technique has the above advantages, in order to realize the advantages in a practical system, and more importantly, to make the OFDM system work normally, it is necessary to develop several key technologies including: frequency synchronization, symbol synchronization, frame synchronization, channel estimation and equalization etc. These key technologies relate not only to application environment of the system but also to requirements on the network configuration of the system.

The purpose of the channel estimation in the above key technologies is that: through the channel estimation, the receiver can obtain the frequency domain information of the channel on which the transmitter transmits the data; based on the frequency domain information of the channel, the receiver can make equalization processing to obtain the data. Therefore, the channel estimation is an important precondition for the receiver to obtain the data correctly and efficiently.

IEEE 802.11a protocol provides a channel estimation technology. The frame structure of an 802.11a system is shown in FIG. 5. Every frame includes a preamble and a data OFDM symbol with uncertain length. The data OFDM symbol includes user data and signaling. The pilot subcarrier allocation solution of 802.11a is shown in FIG. 6. In the physical layer selection solution of 802.11a and 802.16a, the channel estimation uses the preamble. Specifically, the receiver knows the date carried in every subcarrier of the preamble transmitted by the transmitter, so that with the received preamble, the channel condition of every subcarrier of the preamble can be obtained; when the channel environment varies slowly, the channel condition of the subcarriers of the preamble could be considered as the channel condition of the corresponding subcarriers of the OFDM symbol.

In other words, the channel estimation solution provided by 802.11a is based on that channel condition of the data OFDM symbol is approximate to the channel condition of the corresponding preamble. When the channel environment varies rapidly, this approximation will make greater errors. Besides, the channel environment also varies due to the relative movement between the receiver and transmitter. So the above solution is not effective while being applied in the system with rapidly varying channel environment. The channel condition in the current mobile wireless communication system varies rapidly, so obviously the channel estimation solution provided by 802.11a is not suitable for the mobile wireless communication system.

Although in the 802.11a, pilot subcarriers are introduced to trace the variety of the channel so as to amend the channel condition of the subcarriers of the preamble, and to take the amended channel condition of the subcarriers of the preamble as the channel condition of the subcarriers of the data OFDM symbol, the amend can not reflect the rapid variety of the channel condition and will still cause a considerable degradation in the performance.

In order to solve the disadvantages mentioned above, a pilot subcarrier allocation solution of time-frequency grid is proposed by the art and shown in FIG. 7. In this solution, the pilot OFDM symbol, i.e. the preamble, is evenly distributed on the time-frequency plane. Utilizing the pilot OFDM symbol to trace the variety of the channel can partially solve the problem of varying channel.

The SIEMENS Corporation has proposed to the 3GPP RAN1 a proposal Tdoc R1-030780 about a specific solution for allocating the pilot frequency with the time-frequency grid mode, as well as the channel estimation method and the simulation result. The solution uses twice-order one-dimension interpolation to obtain the data subcarrier channel condition on the time-frequency plane: first making third-order Lagrange interpolation on the time-domain, and then making seventh-order Lagrange interpolation on the frequency-domain. The simulation result provided by SIEMENS shows that: comparing the ideal channel estimation, the channel estimation solution of SIEMENS has 0.5-0.7 dB performance degradation for the PA3, PB3 and VA30 channels and even has floor error at BLER=0.13 for the VB30 channel. This means that for channels with large delays, the channel estimation solution of SIEMENS makes large performance degradations.

SUMMARY OF THE INVENTION

In view of the above, the invention provides a method for the channel estimation in the OFDM system in order to reduce the performance degradation at the receiver while making channel estimation.

The invention also provides a transmitter and a receiver for the channel estimation in the OFDM system in order to reduce performance degradation at the receiver while making channel estimation.

According to a method for channel estimation in an Orthogonal Frequency Division Multiplexing (OFDM) system, a transmitter determines a distribution density of pilot OFDM symbols according to the maximum Doppler frequency shift supported by the system, and transmits pilot OFDM symbols and data OFDM symbols based on the distribution density of the pilot OFDM symbols; and a receiver estimates frequency-domain channel information of the data OFDM symbols according to the received pilot OFDM symbols.

An Orthogonal Frequency Division Multiplexing (OFDM) transmitter includes a pilot OFDM symbol distribution density determining module, used for determining a distribution density of the pilot OFDM symbol according to the maximum Doppler frequency shift supported by an OFDM system, whose input is the maximum Doppler frequency shift and output is connected to a pilot OFDM symbol and data OFDM symbol generating and transmitting module; the pilot OFDM symbol and data OFDM symbol generating and transmitting module, used for generating the pilot OFDM symbol and the data OFDM symbol according to the distribution density of the pilot OFDM symbol determined by the pilot OFDM symbol distribution density determining module, and for transmitting the pilot OFDM symbol and the data OFDM symbols.

An Orthogonal Frequency Division Multiplexing (OFDM) receiver includes a channel equalization module and a data channel estimation module, wherein the data channel estimation module includes: a pilot OFDM symbol time-domain channel response calculating module, used for obtaining time-domain channel response at a pilot OFDM symbol according to a received time-domain pilot OFDM symbol, and for outputting the time-domain channel response at the pilot OFDM symbol to a pilot OFDM symbol time-domain channel information calculating module; the pilot OFDM symbol time-domain channel information calculating module, used for calculating time-domain channel information of the pilot OFDM symbol according to the time-domain channel response at the pilot OFDM symbol, and for outputting the time-domain channel information of the pilot OFDM symbol to a data OFDM symbol frequency-domain channel information calculating module; and the data OFDM symbol frequency-domain channel information calculating module, used for calculating frequency-domain channel information of the data OFDM symbol according to the time-domain channel information of the pilot OFDM symbol, and for outputting the calculated frequency-domain channel information to the channel equalization module.

In accordance with the solution provided by the invention, the distribution density of the pilot OFDM symbol may be determined according to the maximum Doppler frequency shift supported by the OFDM system, and the receiver estimates the data OFDM symbol frequency domain channel information according to the received pilot OFDM symbol. In this way, better performance can be achieved at a high-delay and rapidly varying channel environment. The invention enhances the channel environment adaptability of the data communication system, improves the performance of the practical channel estimation in the OFDM system, and increases the data transmission efficiency of the system.

BRIEF DESCRIPTION OF THE DRAWINGS

FIG. 5 is a diagram illustrating a frame in 802.11a.

FIG. 6 is a schematic diagram illustrating pilot frequency distribution in 802.11a.

DETAILED DESCRIPTION OF THE PREFERRED EMBODIMENTS

The invention first sets a distribution density of the pilot OFDM symbol according to the maximum Doppler frequency shift supported by the system; based on the distribution density of the pilot OFDM symbol, the transmitter transmits the pilot OFDM symbol and data OFDM symbol; then the receiver makes the channel estimation of the data OFDM symbol according to the received pilot OFDM symbol.

In the following, the invention will be described in detail with reference to accompanying drawings and embodiments.

Figure 1:
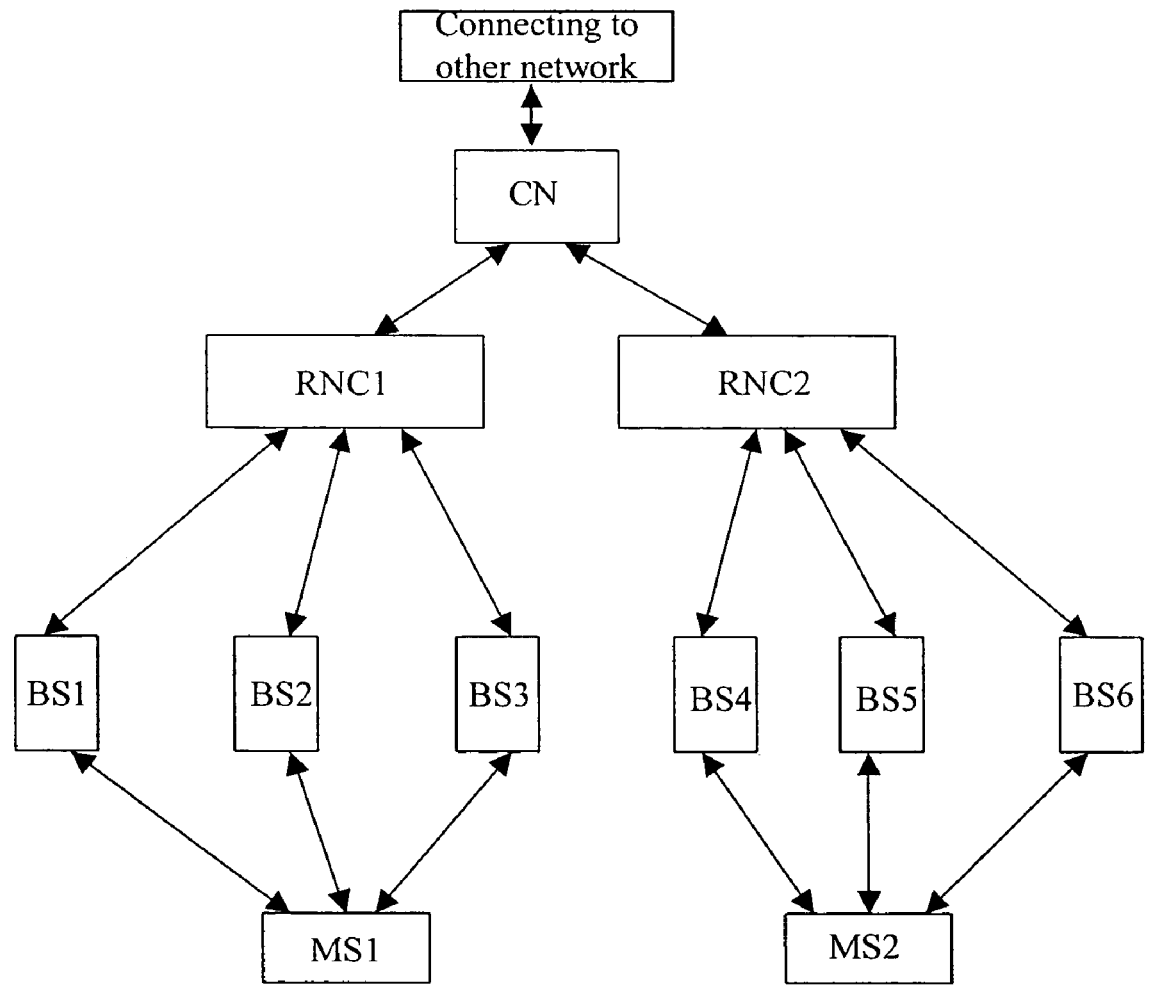
FIG. 1 is a networking diagram illustrating a typical frequency multiplexing cellular system.
Figure 2:
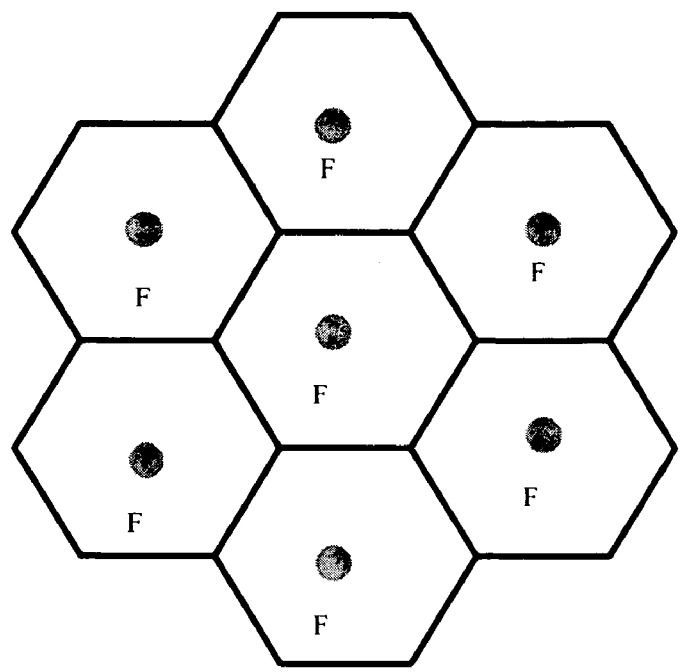
FIG. 2 is a schematic diagram illustrating a typical cell omnidirectional antenna mode.
Figure 3:
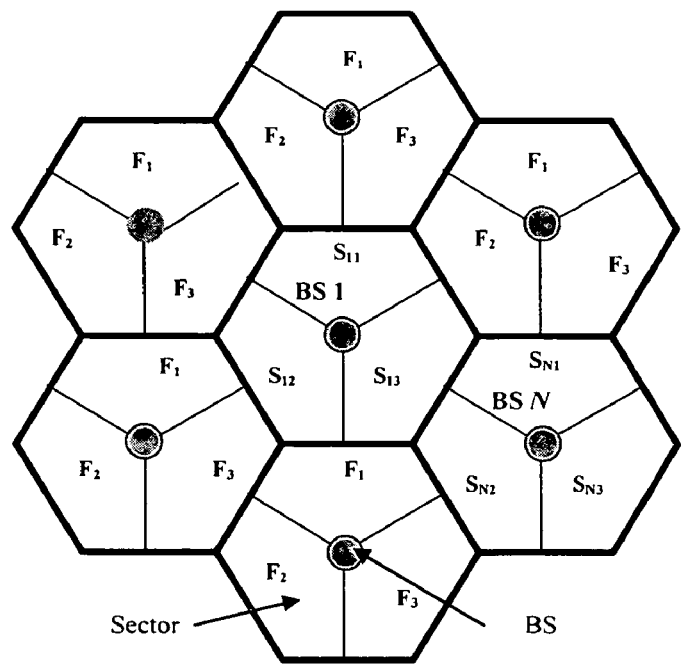
FIG. 3 is a schematic diagram illustrating a typical cell 120 degrees sector antenna mode.
Figure 4:
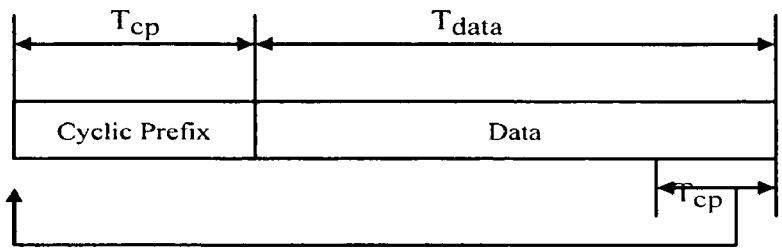
FIG. 4 is a diagram illustrating an OFDM symbol.
Figure 5:
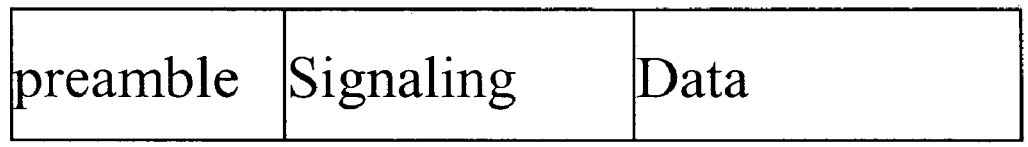
Figure 6:
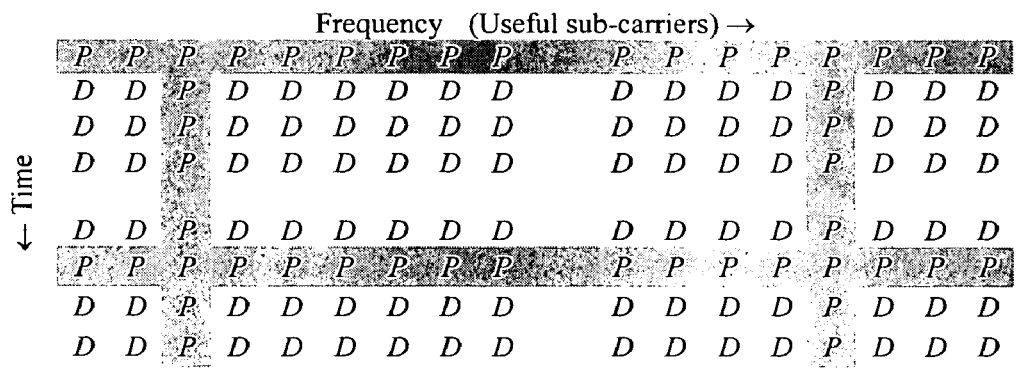
Figure 7:
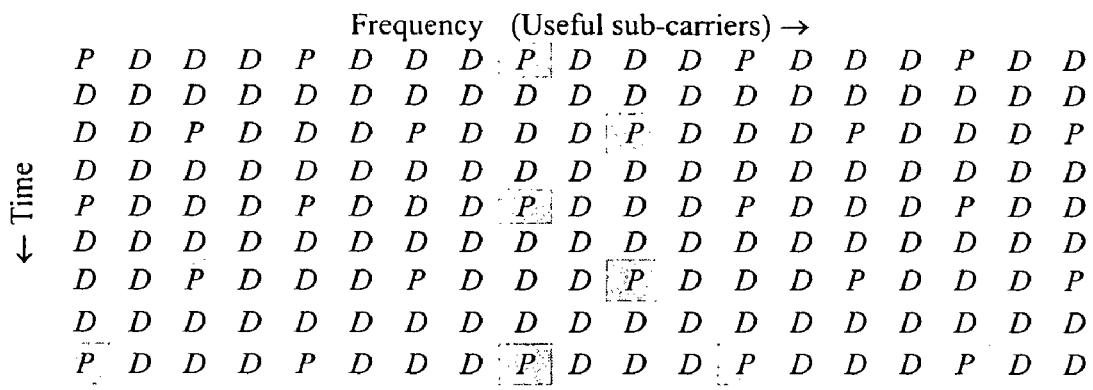
FIG. 7 is a schematic diagram illustrating the pilot frequency grid mode.
Figure 8:
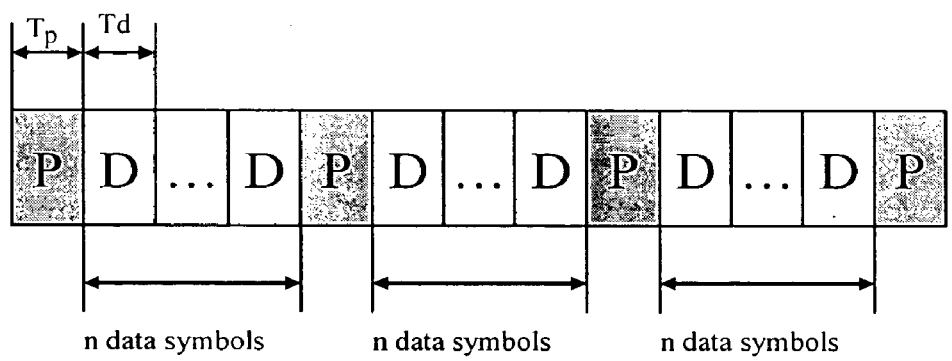
FIG. 8 is a schematic diagram illustrating a distribution relationship between the pilot OFDM symbol and the data OFDM symbol.

First, the distribution density of the pilot OFDM symbol is determined according to the maximum Doppler frequency shift, i.e. the moving speed of the mobile station, supported by the system. Similar to the prior art, the frame structure in accordance with the embodiments of the invention includes the pilot OFDM symbol and the data OFDM symbol, as shown in FIG. 8. To determine the distribution density of the pilot OFDM symbol is to determine the number of the data OFDM symbol between adjacent pilot OFDM symbols. The number of the data OFDM symbol between adjacent pilot OFDM symbols depends on how rapidly the channel environment varies. More specifically, supposing that the relation between the maximum Doppler frequency shift $f_{d,max}$ supported by the system and the maximum moving speed $v_{max}$ supported by the system is:

$$f_{d,\max} = f_c \cdot \frac{v}{c}$$

Wherein, $f_c$ is the carrier frequency of the system, and c is the velocity of light. Generally speaking, the number of the data OFDM symbol between adjacent pilot OFDM symbols should meet the following condition:

$$n \cdot T_d \cdot f_{d,\max} < \frac{1}{2} \text{ i.e., } n \cdot T_d \cdot f_c \cdot \frac{v}{c} < \frac{1}{2}.$$

Wherein $T_d$ is the duration occupied by the data OFDM symbol; and n is the number Of the data OFDM symbol between adjacent pilot OFDM symbols.

Figure 9:
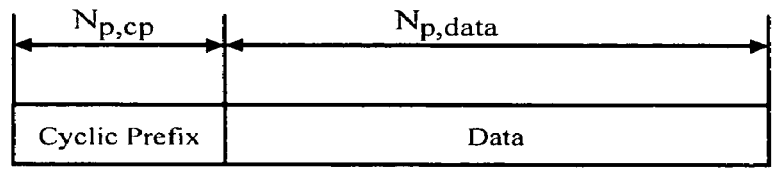
FIG. 9 is a schematic diagram illustrating a structure of the pilot OFDM symbol.
Figure 10:
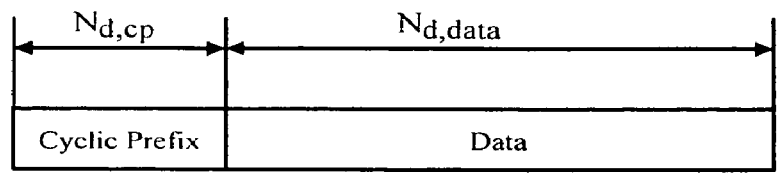
FIG. 10 is a schematic diagram illustrating a structure of the data OFDM symbol.

It is the same with the prior art that the length of the pilot OFDM symbol can be equal or unequal to the length of the data OFDM symbol. Similarly, it is the same with the prior art that both the pilot OFDM symbol and the data OFDM symbol include a cyclic prefix part and a data part; the cyclic prefix part is generated by cycling the last portion of the data part. The length of the cyclic prefix part is expressed as the number of its sample point; and the length of the data part is expressed as the number of its sample points, too. The structure of the pilot OFDM symbol is shown in FIG. 9; wherein the $N_{p,cp}$ is the length of the cyclic prefix part, and the $N_{p,data}$ is the length of the data part. The structure of the data OFDM symbol is shown in FIG. 10; wherein the $Nd_{d,cp}$ is the length of the cyclic prefix part, and the $N_{d,data}$ is the length of the data part.

Usually, the length of the data part in the pilot OFDM symbol can be equal or unequal to the length of the data part in the data OFDM symbol. In order to save the system resource occupied by the pilot OFDM symbol, the solution in accordance with the embodiment of the invention sets the data part length of the pilot OFDM symbol $N_{p,data}$ shorter than the data part length of the data OFDM symbol $N_{d,data}$. In general, the two values $N_{p,data}$ and $N_{d,data}$ can be set to satisfy the following formula:

$$N_{p,data} = \frac{1}{2^n} \cdot N_{d,data}, \text{ wherein } n = 0, 1\ldots$$

Usually the length of the cyclic prefix part of the pilot OFDM symbol can be equal or unequal to the length of the cyclic prefix part of the data OFDM symbol. In order to enhance the negative effect to the pilot OFDM symbol caused by the multipath delay, the solution in accordance with the embodiment of the invention sets the length of the cyclic prefix part of the pilot OFDM symbol $N_{p,cp}$ longer than the length of the cyclic prefix part of the data OFDM symbol $N_{d,cp}$.

Figure 11:
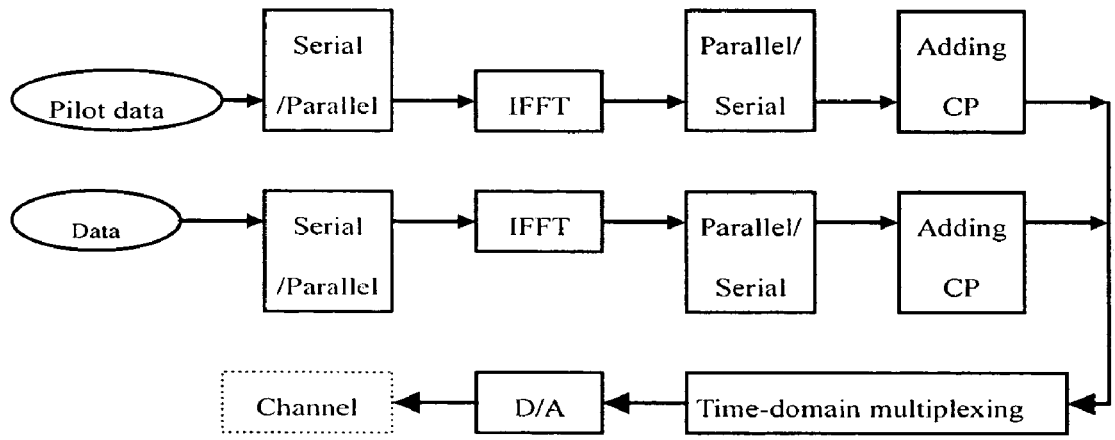
FIG. 11 is a flowchart illustrating the process of a transmitter transmitting OFDM symbols.

Based on the above settings of the pilot OFDM symbol and the data OFDM symbol, while transmitting, first the transmitter generates the pilot OFDM symbol and the data OFDM symbol according to the cyclic prefix part and the data part of the pilot OFDM symbol and the data OFDM symbol, then multiplexes these two symbols on the time-domain, and transmits the generated OFDM symbol after the processes such as D/A converting. The transmitting procedure is shown in FIG. 11.

Figure 12:
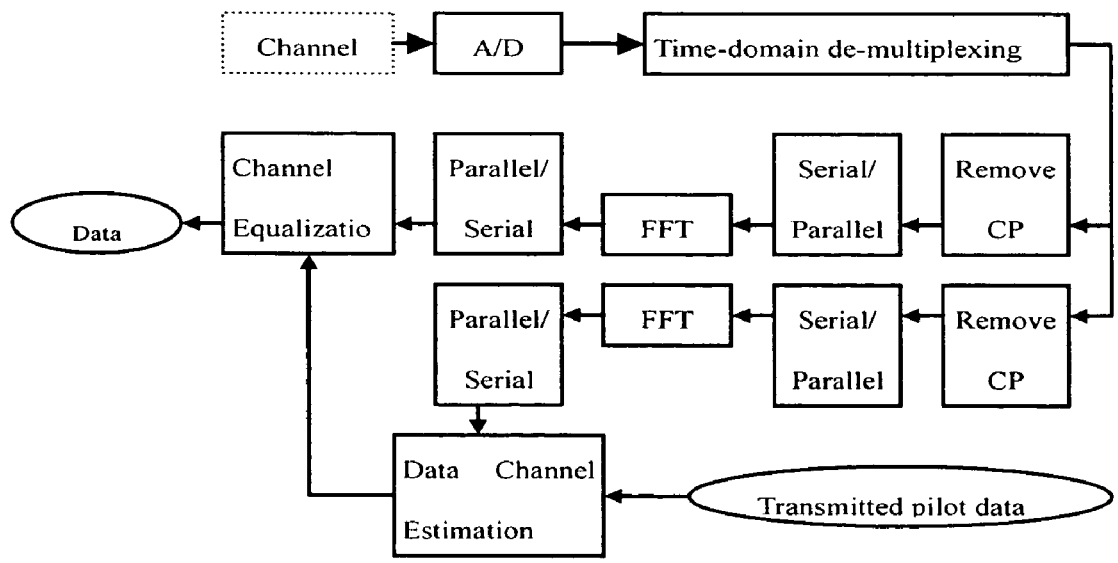
FIG. 12 is a flowchart illustrating the process of a receiver receiving OFDM symbols.

While receiving, first the receiver samples the received electromagnetism signal, then de-multiplexes the sampled data on the time-domain based on the obtained time synchronization to form the time-domain pilot OFDM symbol and the time-domain data OFDM symbol; and then obtains the pilot OFDM symbol and the data OFDM symbol on the frequency-domain; and then estimates the frequency-domain channel information of the data OFDM symbol based on the pilot OFDM symbol; and finally uses channel equalization based on the frequency-domain channel information of the data OFDM symbol to recover the data OFDM symbol transmitted. The receiving procedure is shown in FIG. 12.

During the course of handling the received signal, while making estimation of the frequency-domain channel information of the data OFDM symbol based on the pilot OFDM symbol, the receiver could adopt two solutions besides the existing solution. The first is as follows: the receiver first obtains the time-domain channel information of the pilot OFDM symbol based on the received pilot OFDM symbol; then with the interpolation algorithm, estimates the time-domain channel information of the data OFDM symbol according to the time-domain channel information of the pilot OFDM; and then with the time-domain channel information of the data OFDM symbol, obtains the frequency-domain channel information of the data OFDM symbol. The second method is as follows: first the receiver obtain the time-domain channel information of the pilot OFDM symbol based on the received pilot OFDM symbol; but then obtains the frequency-domain channel information of the pilot OFDM symbol based on the time-domain channel information of the pilot OFDM symbol; and then with the interpolation algorithm, estimates the frequency-domain channel information of the data OFDM symbol according to the frequency-domain channel information of the adjacent pilot OFDM symbol.

In order to describe these two processing ways, numbers are assigned to the transmitted OFDM symbol with the following rules:

The number of the pilot OFDM symbol: the number of the pilot OFDM symbol is assigned according to the transmitting time sequence, and the pilot OFDM symbol that is transmitted earlier takes a smaller number;

The natural number of the n data OFDM symbols between adjacent pilot OFDM symbols: taking the natural number from 1 to n, wherein the data OFDM symbol that is transmitted earlier takes a smaller number;

The number of the data OFDM symbol: first, multiply the number of the pilot OFDM symbol that is adjacent but transmitted earlier than the data OFDM symbol with the number of the data OFDM symbols between the adjacent pilot OFDM symbols, and then add the natural number of the data OFDM symbol between adjacent pilot OFDM symbols.

Figure 13:
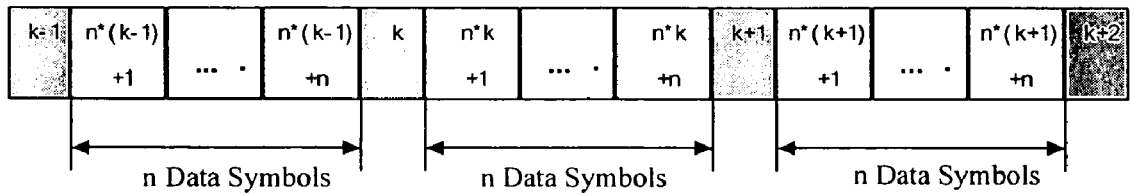
FIG. 13 is a schematic diagram illustrating a number section of OFDM symbols in accordance with the invention.

With the above rules, a portion of the OFDM symbol number is shown in FIG. 13. Wherein, k−1, k, k+1 and k+2 are pilot OFDM symbol numbers, n*(k−1)+1 ..., n*(k−1)+n are the numbers of the data OFDM symbols between the pilot OFDM symbol k−1 and the pilot OFDM symbol k; n*k+1 ..., n*k+n are the numbers of the data OFDM symbols between the pilot OFDM symbol k and the pilot OFDM symbol k+1; n*(k+1)+1 ..., n*(k+1)+n are the numbers of the data OFDM symbols between the pilot OFDM symbol k+1 and the pilot OFDM symbol k+2.

Based on the above rules, supposing that the $i^{th}$ subcarrier of the $k^{th}$ pilot OFDM symbol carries a frequency-domain signal $D_{k,i}$, then the $k^{th}$ pilot OFDM symbol carries frequency-domain signal sequence $(D_{k,0}, D_{k,1}, \ldots, D_{k,N_{p,data}})$.

Figure 14:
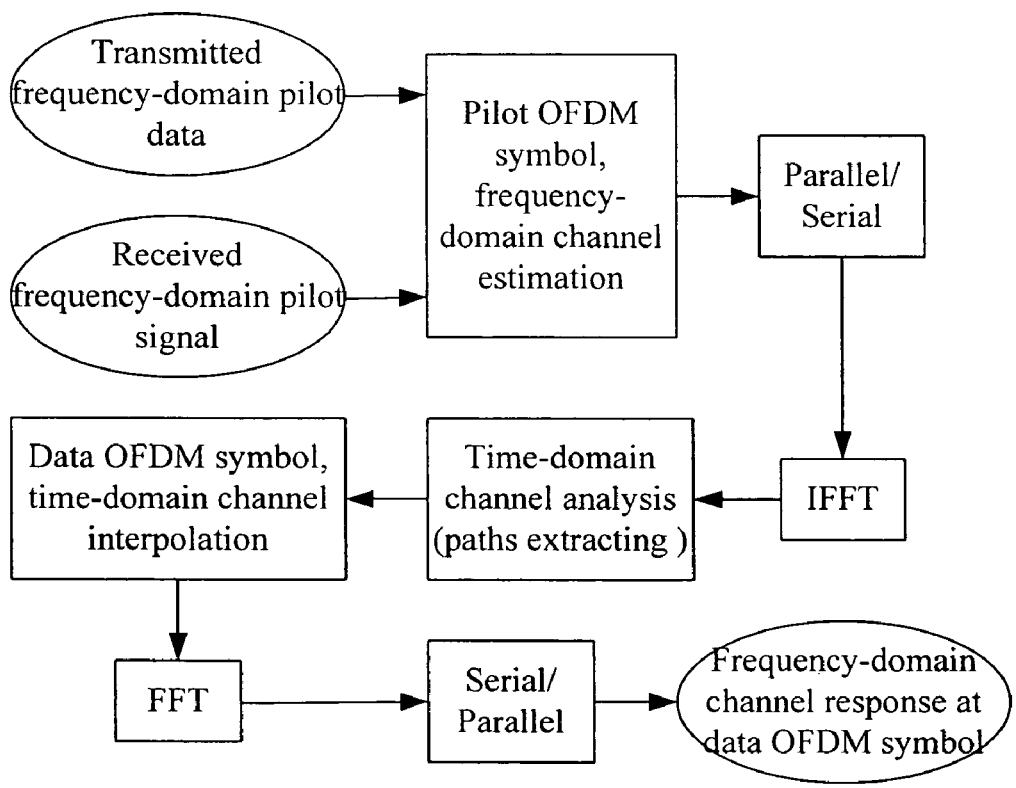
FIG. 14 is a schematic diagram illustrating a course of channel estimation in the receiver in accordance with an embodiment of the invention.
Figure 15:
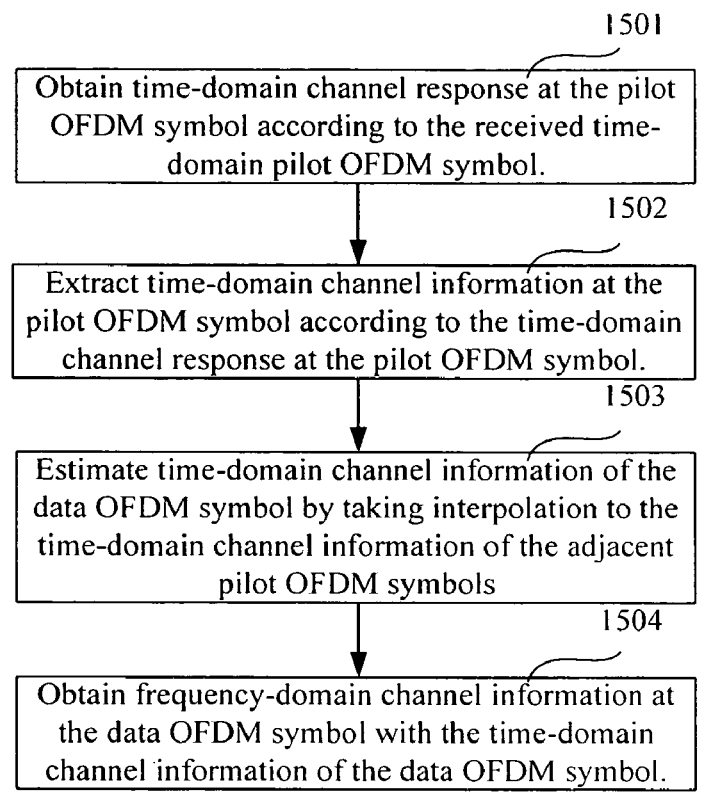
FIG. 15 is a flowchart illustrating a process of channel estimation corresponding to FIG. 14.

The first channel estimation method, according to which the time-domain data OFDM symbol channel information is obtained first, and then the frequency-domain channel information thereof is obtained, will be described in detail in the following. FIG. 14 shows the processing diagram of the first solution and FIG. 15 shows the flowchart.

Step 1501. According to the received time-domain pilot OFDM symbol, the time-domain channel response at the pilot OFDM symbol is obtained.

Supposing that the time-domain signal sequence of the received $k^{th}$ pilot OFDM symbol is $(S_{k,0}', S_{k,1}', \ldots, S_{k,N_{p,data}}')$, through Fourier transform such as Fast Fourier Transform (FFT), the received frequency-domain signal sequence $(D_{k,0}', D_{k,1}', \ldots, D_{k,N_{p,data}}')$ a is obtained. Since the frequency-domain signal sequence carried by the $k^{th}$ pilot OFDM symbol is $(D_{k,0}, D_{k,1}, \ldots, D_{k,N_{p,data}})$, the frequency-domain channel response at the $k^{th}$ pilot OFDM symbol is $$\left( \frac{D'_{k,0}}{D_{k,0}}, \frac{D'_{k,1}}{D_{k,1}}, \ldots, \frac{D'_{k,N_{p,data}}}{D_{k,N_{p,data}}} \right),$$

briefly $(C_{k,0}^P, C_{k,1}^P, \ldots, C_{k,N_{p,data}}^P)$ By making inverse Fourier-transform such as Inverse Fast Fourier Transform (IFFT) to the obtained frequency-domain channel response $(C_{k,0}^P, C_{k,1}^P, \ldots, C_{k,N_{p,data}}^P)$, the time-domain channel response at the $k^{th}$ pilot OFDM symbol is obtained, briefly $(c_{k,0}^P, c_{k,1}^P, \ldots, c_{k,N_{p,data}}^P)$.

Step 1502. According to the time-domain channel response at the pilot OFDM symbol, the time-domain channel information of the pilot OFDM symbol is extracted; the time-domain channel information includes path delay, path fading etc.

Having obtained the time-domain channel response at the pilot OFDM symbol, in order to reduce channel noises and interference, it is necessary to analyze the information to obtain the effective channel information.

There are two methods to obtain the effective channel information: one is a simple truncation method, which may be used when the range of the channel delay of the wireless transmission environment is known; another is an adaptive extracting method of the channel information.

For the simple truncation method, the truncation range is determined based on the delay spread supported by the system. For example, supposing that the maximum channel delay is N sample points, then the time-domain channel response at the pilot OFDM symbol $(c_{k,0}^P, c_{k,1}^P, \ldots, c_{k,N_{p,data}}^P)$, obtained at Step 1502, is directly truncated, and the truncation range is a little bit larger than the corresponding sample points of the maximum delay; for example, the truncation range is N', then N'≧N. In this case, the obtained time-domain channel at the $k^{th}$ pilot OFDM symbol is $(c_{k,0}^P, c_{k,1}^P, \ldots, c_{k,N'}^P, 0, \ldots, 0)$, wherein the number of zero is $N_{p,data}-N'$. For the adaptive extracting method, the most powerful paths among the time-domain channel response $(c_{k,0}^P, c_{k,1}^P, \ldots, c_{k,N_{p,data}}^P)$ of the pilot OFDM symbols, which is continuously received at a period of time from the time-domain channel response, is selected as the effective paths, wherein the selected paths need not to be continuous. For example, in a period of time, the $(c_{k,i_0}^P, c_{k,i_1}^P, \ldots, c_{k,i_M}^P)$ can be selected as the effective channel information for the period of time. Having determined the effective channel information, the zero is used to substitute the non-selected time-domain channel value in the time-domain channel response of the pilot OFDM symbol.

Besides, the adaptive extracting method mentioned above can be simplified. For example, truncation can be taken in the method, so as to form an adaptive truncation method. The adaptive truncation method is as follows: first determining the truncation length N' by analyzing the continuous time-domain channel response $(c_{k,0}^P, c_{k,1}^P, \ldots, c_{k,N_{p,data}}^P)$ at the pilot OFDM symbol in order to find the energy concentrated area and taking the length of the area as N'; then obtaining the time-domain channel value before N' and substituting the unselected time-domain channel response at the pilot OFDM symbol, i.e. the time-domain channel value after N', with zero. In this way, the time-domain channel information is determined.

Step 1503. Estimate the time-domain channel information of the data OFDM symbol by taking a specific interpolation to the time-domain channel information of the adjacent pilot OFDM symbols.

Having obtained the time-domain channel information of the pilot OFDM symbol $(c_{k,0}^P, c_{k,1}^P, \ldots, c_{k,N'}^P, 0, \ldots, 0)$ the time-domain channel information of the data OFDM symbol $(c_{s,0}^d, c_{s,1}^d, \ldots, c_{s,N'}^d, 0, \ldots, 0)$ is estimated, wherein s is the number of the data OFDM symbol.

Specifically, the $c_{k*n+j,i}^d$ value can be estimated by using the $(\ldots, c_{k-1,i}^P, c_{k,i}^P, c_{k+1,i}^P, c_{k+2,i}^P, \ldots)$, wherein j is the natural number of the data OFDM symbols between the adjacent pilot OFDM symbols.

To estimate the value, a $(2\,l-1)^{th}$-order Lagrange interpolation can be adopted. The typical estimation formula is:

$$c_{k*n+j,i}^d = \sum_{m=-l+1}^{l} c_{k+m,i}^p \cdot \left( \frac{1}{\left( \prod_{q=1}^{l-m} q \right) \cdot \left( \prod_{q=-l+m-m}^{-l} q \right)} \right) \cdot \left( \frac{\prod_{q=-l+1}^{l} \left( \frac{j}{n+1} - q \right)}{\left( \frac{j}{n+1} - m \right)} \right)$$

wherein the $c_{k+m,i}^p$ the time-domain channel value at the $i^{th}$ sample point of the $(k+m)^{th}$ pilot OFDM symbol, and $c_{k*n+j,i}^d$ is the time-domain channel value at the $i^{th}$ sample point of the $(k*n+j)^{th}$ data OFDM symbol, and n is the number of data OFDM symbols between the adjacent pilot OFDM symbols.

When first-order Lagrange interpolation, i.e. linear interpolation, is adopted, the above formula is simplified to:

$$c^d_{k*n+j,i} = c^p_{k,i} + \frac{j}{n+1} \cdot (c^p_{k+1,i} - c^p_{k,i})$$

Wherein $c_{k,i}^p$ the time-domain channel value at the $i^{th}$ sample point of the $k^{th}$ pilot OFDM symbol, and $c_{k*n+j,i}^d$ is the time-domain channel value at the $i^{th}$ sample point of the $(k*n+j)^{th}$ data OFDM symbol, and n is the number of data OFDM symbols between the adjacent pilot OFDM symbols.

It may also use $(2l-1)^{th}$-order the logarithmic Lagrange interpolation, the typical estimation formula is:

$$\ln(c^d_{k*n+j,i}) = \sum_{m=-l+1}^{l} \ln(c^p_{k+m,i}) \cdot \left(\frac{1}{\left(\prod_{q=1}^{l-m} q\right) \cdot \left(\prod_{q=-l+m-m}^{-l} q\right)}\right) \cdot \left(\frac{\prod_{q=-l+1}^{l}\left(\frac{j}{n+1} - q\right)}{\left(\frac{j}{n+1} - m\right)}\right)$$

wherein the $c_{k+m,i}^p$ is the time-domain channel value at the $i^{th}$ sample point of the $(k+m)^{th}$ pilot OFDM symbol, and $c_{k*n+j,i}^d$ is the time-domain channel value at the $i^{th}$ sample point of the $(k*n+j)^{th}$ data OFDM symbol, and n is the number of data OFDM symbols between the adjacent pilot OFDM symbols.

Similarly, when first-order logarithmic Lagrange interpolation, i.e. linear logarithmic Lagrange interpolation is adopted, the above formula is simplified to:

$$\ln(c^d_{k*n+j,i}) = \ln(c^p_{k,i}) + \frac{j}{n+1} \cdot (\ln(c^p_{k+1,i}) - \ln(c^p_{k,i}))$$

wherein the $c_{k,i}^p$ is the time-domain channel value at the ith sample point of the (k+m)th pilot OFDM symbol, and the $c_{k*n+j,i}^d$ is the time-domain channel value at the $i^{th}$ sample point of the $(k*n+j)^{th}$ data OFDM symbol, and n is the number of data OFDM symbols between the adjacent pilot OFDM symbols.

With anyone of the above formulas, the $(c_{s,0}^d, c_{s,1}^d, \ldots, c_{s,N'}^d)$ value is estimated; after adding $N_{d,data}-N'$ of zeros to follow it, the $(c_{s,0}^d, c_{s,1}^d, \ldots, c_{s,N'}^d, 0, \ldots, 0)$ is obtained.

Step 1504. With the time-domain channel information of the data OFDM symbol, the frequency-domain channel information of the data OFDM symbol can be obtained.

Specifically, the frequency-domain channel response at the $s^{th}$ data OFDM symbol $(C_{s,0}^d, C_{s,1}^d, \ldots, C_{s,N_{d,data}}^d)$ is obtained by taking IFFT to the obtained time-domain channel response at the sth data OFDM symbol $(c_{s,0}^d, c_{s,1}^d, \ldots, c_{s,N'}^d, 0, \ldots, 0)$.

Figure 16:
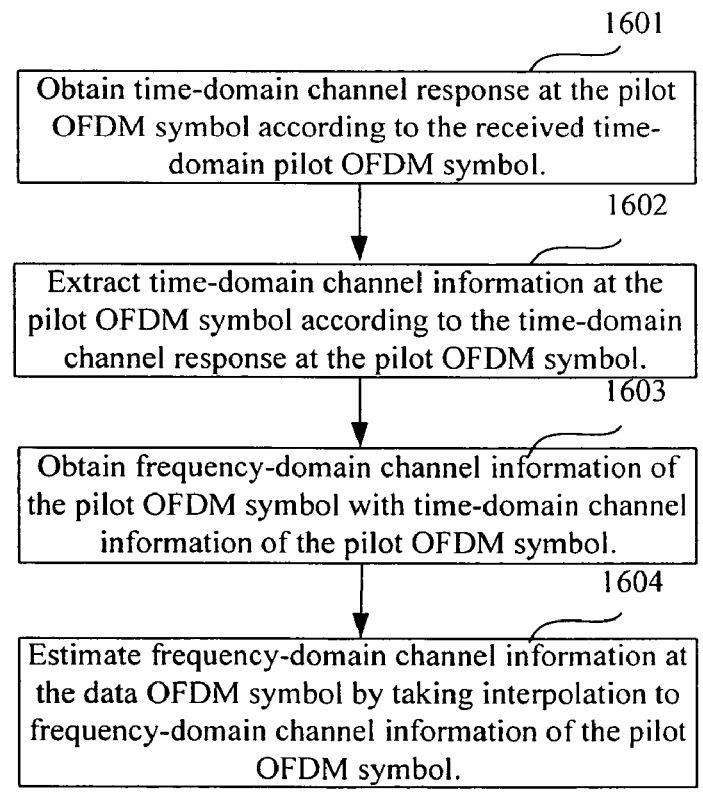
FIG. 16 is a flowchart illustrating another process of channel estimation.

According to the second channel estimation method, first the frequency-domain channel information of the pilot OFDM symbol is obtained, and the frequency-domain channel information of the data OFDM symbol is obtained. The flowchart is shown in FIG. 16 with the following steps:

Step 1601. According to the received time-domain pilot OFDM symbol, the time-domain channel response at the pilot OFDM symbol is obtained.

This step is the same as Step 1501.

Step 1602. According to the time-domain channel response at the pilot OFDM symbol, the time-domain channel information of the pilot OFDM symbol is extracted; the time-domain channel information includes the path delay, the path fading, etc.

This step is the same as Step 1502.

Step 1603. The corresponding frequency-domain channel information of the pilot OFDM symbol is obtained according to the obtained time-domain channel information of the pilot OFDM symbol.

Step 1604. The frequency-domain channel information of the data OFDM symbol is estimated by taking interpolation to the frequency-domain channel information of the pilot OFDM symbol.

In Step 1604, the interpolation is the $(2l-1)^{th}$-order Lagrange interpolation. Besides, the frequency-domain channel information of the data OFDM symbol may be obtained without interpolation, but by directly taking the frequency-domain channel information of the pilot OFDM symbol as the frequency-domain channel information of the data OFDM symbol that is adjacent to the pilot OFDM symbol.

Figure 17:
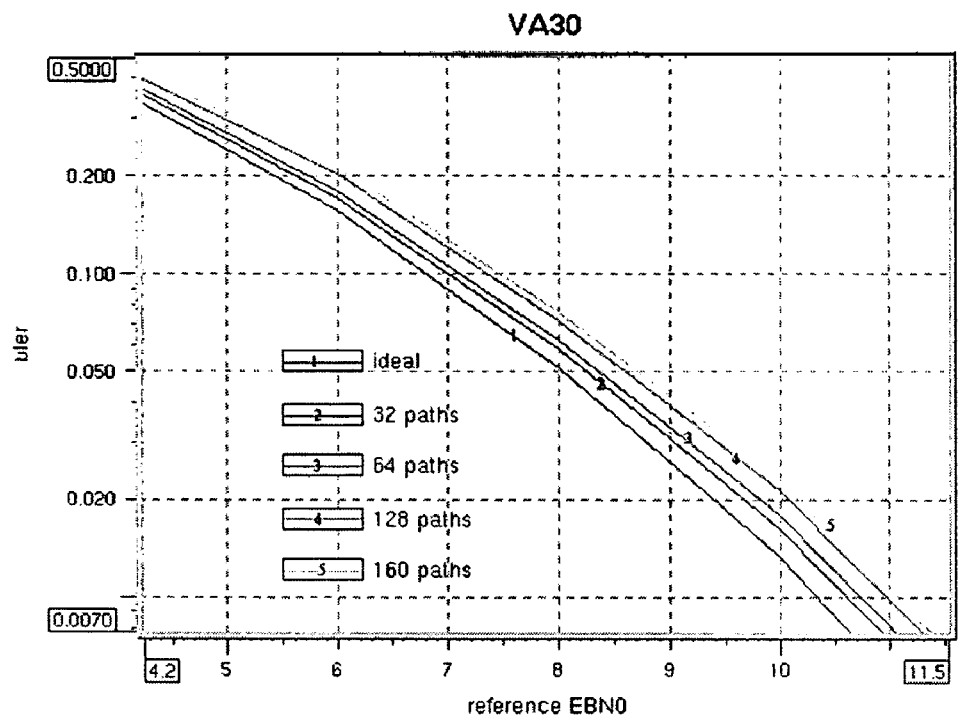
FIG. 17 is a simulation diagram of channel estimation performance under Vehicle A channel, 30 kmph and truncation path of 32.
Figure 18:
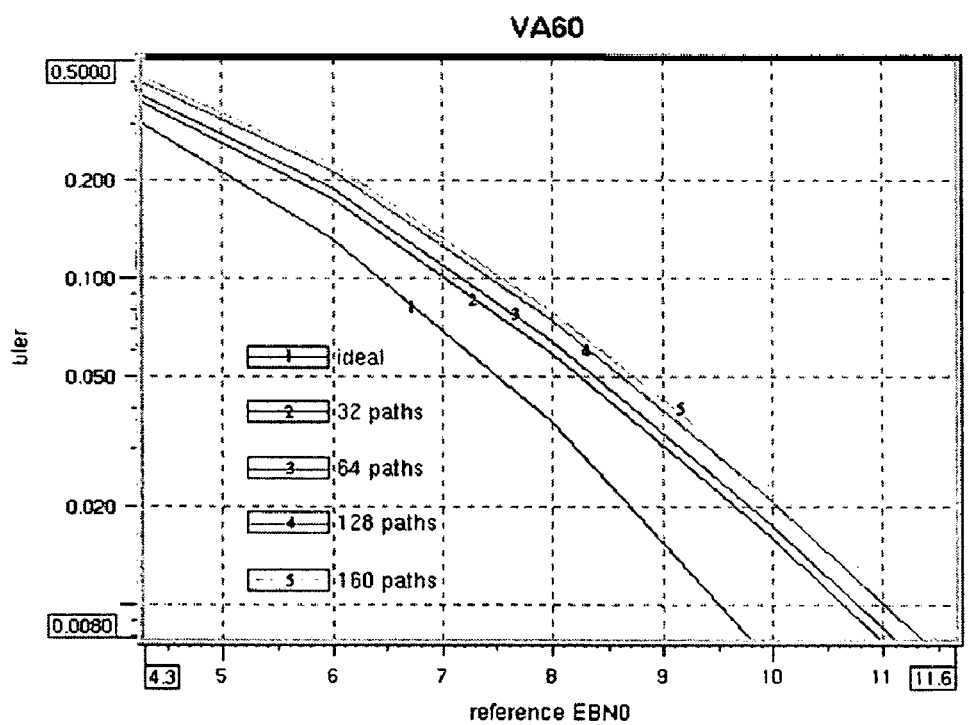
FIG. 18 is a simulation diagram of channel estimation performance under Vehicle A channel, 60 kmph and truncation path of 32.
Figure 19:
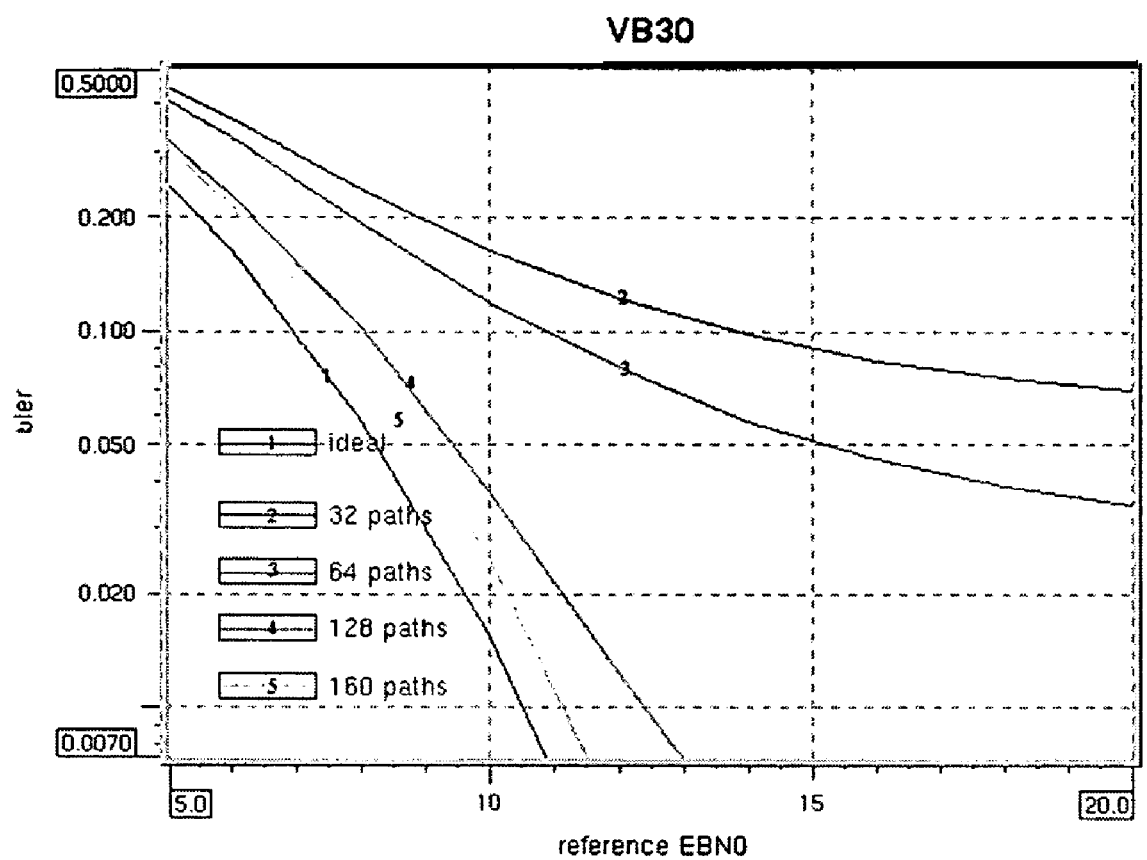
FIG. 19 is a simulation diagram of channel estimation performance under Vehicle B channel, 30 kmph and truncation path of 160.

The solution in accordance with the invention has better performance in channel environments that are rapidly varying and that have a high delay. Specifically, comparing with the ideal channel estimation, when the truncation path number is 32, for the channel estimation of Vehicle A channel with 30 kmph the performance loss is less than 0.3 dB, which is shown in FIG. 17; when the truncation path number is 32, for the channel estimation of Vehicle A channel with 60 kmph the performance loss is less than 1.1 dB, which is shown in FIG. 18; even when the truncation path number is 160, for the channel estimation of Vehicle B channel with 30 kmph the performance loss is less than 0.7 dB, which is shown in FIG. 9.

The foregoing description is only the preferred embodiments of the present invention and is not to be used for limiting the invention, and that various other changes, equal substitutions and modifications without departing from the scope and spirit of the invention are intended to be included within the scope of the present invention.

What is claimed is:

1. A method for channel estimation in an Orthogonal Frequency Division Multiplexing (OFDM) system, comprising:

determining a distribution density of pilot OFDM symbols according to the maximum Doppler frequency shift supported by the system, setting a relation between the length of data part of a pilot OFDM symbol $N_{p,data}$ and the length of data part of a data OFDM symbol $N_{d,data}$ as the following formula:

$$N_{p,data} = \frac{1}{2^n} \cdot N_{d,data}, \text{ wherein } n = 0, 1 \ldots,$$

and transmitting pilot OFDM symbols and data OFDM symbols based on the distribution density of the pilot OFDM symbols by a transmitter; and estimating frequency-domain channel information of the data OFDM symbols according to the received pilot OFDM symbols by a receiver.

2. The method according to claim 1, wherein determining the distribution density of the pilot OFDM symbols according to the maximum Doppler frequency shift comprises:

determining the number of the data OFDM symbols between the adjacent pilot OFDM symbols with the following formula:

$$n \cdot T_d \cdot f_{d,\max} < \frac{1}{2}$$

wherein n is the number of the data OFDM symbols between the adjacent pilot OFDM symbols, $T_d$ is the duration occupied by one data OFDM symbol, and $f_{d,max}$ is the maximum Doppler frequency shift supported by the system.

3. The method according to claim 1, further comprising:
selling the length of the cyclic prefix part of the pilot OFDM symbol larger than the length of the cyclic prefix part of the data OFDM symbol.

4. The method according to claim 2, further comprising:
selling the length of the cyclic prefix part of the pilot OFDM symbol larger than the length of the cyclic prefix part of the data OFDM symbol.

5. The method according to claim 1, wherein estimating frequency-domain channel information of the data OFDM symbols according to the received pilot OFDM symbols comprises:
obtaining time-domain channel response of the pilot OFDM symbol according to received time-domain pilot OFDM symbols;
extracting the time-domain channel information of the pilot OFDM symbol according to the time-domain channel response of the pilot OFDM symbol; and
estimating frequency-domain channel information of the data OFDM symbol according to the time-domain channel information of the pilot OFDM symbols.

6. The method according to claim 5, wherein obtaining time-domain channel response of the pilot OFDM symbol according to received time-domain pilot OFDM symbols comprises:
obtaining the received frequency-domain signal of the pilot OFDM symbol according to the received time-domain pilot OFDM symbols;
obtaining the frequency-domain channel response of the pilot OFDM symbol according to the received frequency-domain signal of the pilot OFDM symbol and the frequency-domain signal of the pilot OFDM symbol transmitted by the transmitter; and
obtaining the time-domain channel response of the pilot OFDM symbol by making Inverse Fourier Transform to the frequency-domain channel response of the pilot OFDM symbol.

7. The method according to claim 5, wherein extracting the time-domain channel information of the pilot OFDM symbol according to the time-domain channel response of the pilot OFDM symbol comprises:
determining a truncation range according to a time delay spread supported by the system;
obtaining time-domain channel values within the truncation range from the time-domain channel response of the pilot OFDM symbol obtained; and
substituting zero for the time-domain channel values that have been truncated.

8. The method according to claim 5, wherein extracting the time-domain channel information of the pilot OFDM symbol according to the time-domain channel response of the pilot OFDM symbol comprises:
determining one or more than one most powerful paths of the time-domain channels through analyzing time-domain channel response of continuous pilot OFDM symbols;
selecting the time-domain channel value corresponding to the most powerful paths; and
substituting zero for those time-domain channel values that have not been selected.

9. The method according to claim 5, wherein extracting the time-domain channel information of the pilot OFDM symbol according to the time-domain channel response of the pilot OFDM symbol comprises:
determining a truncation range by analyzing time-domain channel response of the continuous pilot OFDM symbols;
selecting time-domain channel values within the truncation range; and
substituting zero for the time-domain channel values that have not been selected.

10. The method according to claim 5, wherein estimating frequency-domain channel information of the data OFDM symbol according to the time-domain channel information of the pilot OFDM symbols comprises:
obtaining time-domain channel information of the data OFDM symbol by taking an interpolation estimation to the time-domain channel information of the adjacent pilot OFDM symbols; and
obtaining corresponding frequency-domain channel information by making Inverse Fourier Transform to the time-domain channel information of the data OFDM symbol.

11. The method according to claim 10, wherein taking the interpolation estimation to the time-domain channel information of the adjacent pilot OFDM symbols comprises:
taking (2 l–1)th-order Lagrange interpolation or (2 l–1)th-order Logarithmic Lagrange interpolation for the interpolation estimation.

12. The method according to claim 5, wherein estimating frequency-domain channel information of the data OFDM symbol according to the time-domain channel information of the pilot OFDM symbols comprises:
obtaining the corresponding frequency-domain channel information according to the obtained time-domain channel information of the pilot OFDM symbol; and
obtaining the frequency-domain channel information of the data OFDM symbol by taking an interpolation estimation to the frequency-domain channel information of the adjacent pilot OFDM symbols.

13. The method according to claim 12, wherein obtaining the frequency-domain channel information of the data OFDM symbol by taking the interpolation estimation to the frequency-domain channel information of the adjacent pilot OFDM symbols comprises:
taking (2 l–1)th-order Lagrange interpolation to obtain the frequency-domain channel information of the data OFDM symbol;
or
directly taking the frequency-domain channel information of the pilot OFDM symbol as the frequency-domain channel information of the data OFDM symbol that is adjacent to the pilot OFDM symbol.

14. An Orthogonal Frequency Division Multiplexing (OFDM) transmitter, comprising:
a pilot OFDM symbol distribution density determining module, used for determining a distribution density of the pilot OFDM symbol according to the maximum Doppler frequency shift supported by an OFDM system, whose input is the maximum Doppler frequency shift and output is connected to a pilot OFDM symbol and data OFDM symbol generating and transmitting module; and the pilot OFDM symbol and data OFDM symbol generating and transmitting module, used for generating the pilot OFDM symbol and the data OFDM symbol according to the distribution density of the pilot OFDM symbol determined by the pilot OFDM symbol distribution density determining module, wherein a relation between the length of data part of a pilot OFDM symbol $N_{p,data}$ and the length of data part of a data OFDM symbol $N_{d,data}$ meets the following formula:

$$N_{p,data} = \frac{1}{2^n} \cdot N_{d,data}; \text{ wherein } n = 0, 1 \ldots$$

and for transmitting the pilot OFDM symbol and the data OFDM symbols.

15. An Orthogonal Frequency Division Multiplexing (OFDM) receiver, comprising a channel equalization module and a data channel estimation module, wherein the data channel estimation module comprises:

a pilot OFDM symbol time-domain channel response calculating module, used for obtaining time-domain channel response at a pilot OFDM symbol according to a received time-domain pilot OFDM symbol, and for outputting the time-domain channel response at the pilot OFDM symbol to a pilot OFDM symbol time-domain channel information calculating module;

the pilot OFDM symbol time-domain channel information calculating module, used for calculating time-domain channel information of the pilot OFDM symbol according to the time-domain channel response at the pilot OFDM symbol, and for outputting the time-domain channel information of the pilot OFDM symbol to a data OFDM symbol frequency-domain channel information calculating module; and the data OFDM symbol frequency-domain channel information calculating module, used for calculating frequency-domain channel information of the data OFDM symbol according to the time-domain channel information of the pilot OFDM symbol, and for outputting the calculated frequency-domain channel information to the channel equalization module.

16. The receiver according to claim 15, wherein the data OFDM symbol frequency-domain channel information calculating module comprises:

a first interpolating sub-module, used for calculate the time-domain channel information of the data OFDM symbol with an interpolation algorithm according to the time-domain channel information of the pilot OFDM symbol, and for outputting the calculating result to a first converting sub-module; and the first converting sub-module, used for obtaining the frequency-domain channel information of the data OFDM symbol with a converting algorithm according to the time-domain channel information of the data OFDM symbol, and for outputting the converting result to the channel equalization module.

17. The receiver according to claim 16, wherein the data OFDM symbol frequency-domain channel information calculating module comprises:

a second converting sub-module, used for obtaining the frequency-domain channel information of the pilot OFDM symbol with a converting algorithm according to the time-domain channel information of the pilot OFDM symbol, and for outputting the calculating result to a second interpolation module; and the second interpolating sub-module, uses for obtaining the frequency-domain channel information of the data OFDM symbol with an interpolation algorithm according to the frequency-domain channel information of the pilot OFDM symbol, and for outputting the calculating result to the channel equalization module.

* * * * *